United States Patent
Gehrmann

(10) Patent No.: US 11,165,772 B2
(45) Date of Patent: Nov. 2, 2021

(54) METHODS AND DEVICES OF ENABLING AUTHENTICATION OF A USER OF A CLIENT DEVICE OVER A SECURE COMMUNICATION CHANNEL BASED ON BIOMETRIC DATA

(71) Applicant: FINGERPRINT CARDS AB, Gothenburg (SE)

(72) Inventor: Christian Gehrmann, Lund (SE)

(73) Assignee: FINGERPRINT CARDS AB, Gothenburg (SE)

( * ) Notice: Subject to any disclaimer, the term of this patent is extended or adjusted under 35 U.S.C. 154(b) by 56 days.

(21) Appl. No.: 16/644,216

(22) PCT Filed: Sep. 6, 2018

(86) PCT No.: PCT/SE2018/050894
§ 371 (c)(1),
(2) Date: Mar. 4, 2020

(87) PCT Pub. No.: WO2019/054914
PCT Pub. Date: Mar. 21, 2019

(65) Prior Publication Data
US 2021/0075785 A1 Mar. 11, 2021

(30) Foreign Application Priority Data
Sep. 13, 2017 (SE) .................... 1751107-2

(51) Int. Cl.
*H04L 29/06* (2006.01)
*G06K 9/00* (2006.01)

(52) U.S. Cl.
CPC ...... *H04L 63/0861* (2013.01); *G06K 9/00926* (2013.01); *H04L 63/062* (2013.01); *H04L 63/123* (2013.01); *H04L 63/18* (2013.01)

(58) Field of Classification Search
CPC . H04L 63/0861; H04L 63/086; H04L 63/123; H04L 63/18; H04L 9/0894; G06K 9/00926; G06F 21/32
See application file for complete search history.

(56) References Cited

U.S. PATENT DOCUMENTS

| 7,181,017 B1 | 2/2007 | Nagel et al. |
| 8,850,299 B2 * | 9/2014 | Chabanne ............. H04L 9/3231 714/799 |

(Continued)

FOREIGN PATENT DOCUMENTS

| WO | 2009073144 A2 | 6/2009 |
| WO | 2009115611 A2 | 9/2009 |
| WO | 2016128906 A1 | 8/2016 |

OTHER PUBLICATIONS

Ahmad, T., "Global and Local Feature-based Transformations for Fingerprint Data Protection," RMIT University, Melbourne, Australia, Jan. 2012, https://researchrepository.rmit.edu.au/esploro/outputs/doctoral/Global-and-local-feature-based-transformations-for-fingerprint-data-protection/9921861562801341#files_and_links, 188 pages.

(Continued)

*Primary Examiner* — Sarah Su
(74) *Attorney, Agent, or Firm* — RMCK Law Group, PLC

(57) ABSTRACT

A network node is configured to enable authentication of a user of a client device based on biometric data captured by the client device. The network node receives, from the client device, a request to authenticate a user that includes a first set of transformed biometric data transformed with a first secret feature transform key shared with the client device; fetches, from a secure end-user repository, a second set of enrolled transformed biometric data associated with the first set of transformed biometric data and a second secret feature (Continued)

transform key with which the second set of biometric data was transformed at enrolment of the transformed biometric data; and submits the second set of transformed biometric data and the second secret feature transform key over a secure communication channel to the client device.

17 Claims, 4 Drawing Sheets

(56) References Cited

U.S. PATENT DOCUMENTS

| | | | | |
|---|---|---|---|---|
| 9,792,421 | B1* | 10/2017 | Weber | H04L 63/0861 |
| 10,305,690 | B1* | 5/2019 | Gehrmann | H04L 63/126 |
| 2009/0271634 | A1 | 10/2009 | Boult et al. | |
| 2010/0241595 | A1 | 9/2010 | Felsher | |
| 2011/0037563 | A1 | 2/2011 | Choi et al. | |
| 2011/0047377 | A1 | 2/2011 | Allen et al. | |
| 2013/0174243 | A1* | 7/2013 | Inatomi | H04L 63/0861 726/7 |
| 2013/0212645 | A1* | 8/2013 | Takahashi | H04L 9/3093 726/3 |
| 2016/0164682 | A1 | 6/2016 | Hartloff et al. | |
| 2017/0034150 | A1 | 2/2017 | Thibadeau et al. | |
| 2020/0007337 | A1* | 1/2020 | Gehrmann | H04L 9/3271 |
| 2020/0127824 | A1* | 4/2020 | Gehrmann | G06F 21/32 |
| 2020/0244451 | A1* | 7/2020 | Herder, III | H04L 9/0866 |
| 2021/0006597 | A1* | 1/2021 | Gehrmann | H04L 63/20 |
| 2021/0152360 | A1* | 5/2021 | Gehrmann | G06K 9/00926 |

OTHER PUBLICATIONS

Extended European Search Report dated May 4, 2021 for EP Application No. 18857323.2, 6 pages.
Dang, T. et al., "Cancellable fuzzy vault with periodic transformation for biometric template protection," IET Biometrics, Sep. 1, 2016, vol. 5, Issue 3, pp. 229-235.
Martinez, D. et al., "Secure Crypto-Biometric System for Cloud Computing," Securing Services on the Cloud (IWSSCC), 2011, IEEE, pp. 38-45.
Nandakumar, K. et al., "BioSAKE: Biometrics-based Secure Authentication and Key Exchange," 2013 International Conference on Biometrics (ICB), IEEE, 12 pages.
PCT International Search Report and Written Opinion dated Nov. 9, 2018 for International Application No. PCT/SE2018/050894, 12 pages.
Sui, Y. et al., "Biometrics-based authentication: a new approach," Computer Communications and Networks (ICCCN), IEEE 2011, 6 pages.
Vigila, S. et al., "Biometric security system over finite field for mobile applications," IET Inf. Secur., 2015, vol. 9, Issue 2, pp. 119-126.

* cited by examiner

METHODS AND DEVICES OF ENABLING AUTHENTICATION OF A USER OF A CLIENT DEVICE OVER A SECURE COMMUNICATION CHANNEL BASED ON BIOMETRIC DATA

CROSS-REFERENCE TO RELATED APPLICATIONS

This application is a 371 U.S. National Stage of International Application No. PCT/SE2018/050894, filed Sep. 6, 2018, which claims priority to Swedish Patent Application No. 1751107-2, filed Sep. 13, 2017. The disclosures of each of the above applications are incorporated herein by reference in their entirety.

TECHNICAL FIELD

The invention relates to methods and devices of enabling authentication of a user of a client device over a secure communication channel based on biometric data.

BACKGROUND

Biometrics-based identification is a user-friendly way to securely authenticate human users. One major problem with biometric data when using it for identification purposes in distributed systems is that template biometric data must be available at a node in a computer system where the end-user is supposed to be identified. This constitute a major security design challenge in distributed computer system as this typically requires original, clear text biometric data to be stored at a central node and distributed in the system. Such solutions are very vulnerable to original biometric data compromise, and data compromised on one system may lead to a situation that the same biometric data is compromised on all other systems as well where the biometric data is used. Simply encrypting the biometric data will not solve this problem as the original biometric data must be available at the remote location during authentication.

Hence, there is a need to provide solutions that allow remote authentication based on biometric identification but at the same time provide protection of the original biometric data.

SUMMARY

An object of the present invention is to solve, or at least mitigate, this problem in the art and thus to provide an improved method of enabling authentication of a user of a client device over a secure communication channel based on biometric data.

This object is attained in a first aspect of the invention by a method performed by a client device of enabling authentication of a user of the client device based on biometric data captured by the client device. The method comprises capturing at least one set of biometric data of the user, transforming the at least one set of biometric data into a first and a second set of non-invertible biometric data, and submitting an enrolment request comprising the first and second transformed sets of biometric data over a secure communication channel to a trusted network node.

This object is attained in a second aspect of the invention by a client device configured to enable authentication of a user of the client device based on biometric data captured by the client device. The client device comprises a biometric data sensing system comprising a biometric data sensor and a processing unit. The biometric data sensor is configured to capture at least one set of biometric data of the user, and the processing unit is configured to transform the at least one set of biometric data into a first and a second set of non-invertible biometric data, and submit an enrolment request comprising the first and second transformed sets of biometric data over a secure communication channel to a trusted network node.

This object is attained in a third aspect of the invention by a method performed by a network node of enabling authentication of a user of a client device based on biometric data captured by the client device. The method comprises receiving, from the client device, an enrolment request comprising at least a first and a second set of transformed biometric data of the user over a secure communication channel, and storing the received first and second set of transformed biometric data, a secret feature transform key with which the second set of biometric data was transformed at the client device in a secure end-user repository.

This object is attained in a fourth aspect of the invention by a network node configured to enable authentication of a user of a client device based on biometric data captured by the client device. The trusted network node comprises a processing unit being configured to receive, from the client device, an enrolment request comprising at least a first and a second set of transformed biometric data of the user over a secure communication channel, and store the received first and second set of transformed biometric data, a secret feature transform key with which the second set of biometric data was transformed at the client device, in a secure end-user repository.

This object is attained in a fifth aspect of the invention by a method performed by a network node of enabling authentication of a user of a client device based on biometric data captured by the client device. The method comprises receiving, from the client device, a request to authenticate a user of the client device, the authentication request comprising a first set of transformed biometric data transformed with a first secret feature transform key shared with the client device, fetching, from the secure end-user repository, a second set of enrolled transformed biometric data associated with the first set of transformed biometric data received from the client device and a second secret feature transform key with which the second set of biometric data was transformed at enrolment of the transformed biometric data at the network node, and submitting the second set of transformed biometric data and the second secret feature transform key over a secure communication channel to the client device.

This object is attained in a sixth aspect of the invention a network node configured to enable authentication of a user of a client device based on biometric data captured by the client device. The trusted network node comprising a processing unit is configured to receive, from the client device, a request to authenticate a user of the client device, the authentication request comprising a first set of transformed biometric data transformed with a first secret feature transform key shared with the client device, fetch, from the secure end-user repository, a second set of enrolled transformed biometric data associated with the first set of transformed biometric data received from the client device and a second secret feature transform key with which the second set of biometric data was transformed at enrolment of the transformed biometric data at the network node, and submit the second set of transformed biometric data and the second secret feature transform key over a secure communication channel to the client device.

This object is attained in a seventh aspect of the invention by a method performed by a client device of enabling authentication of a user of the client device based on biometric data enrolled at a trusted network node. The method comprises capturing biometric data of the user, transforming the captured biometric data into a first set of non-invertible biometric data using a first secret feature transform key shared with the client device, submitting, to the trusted network node, a request to authenticate the user of the client device, the authentication request comprising the first set of transformed biometric data, receiving, from the trusted network node, at least one second set of transformed biometric data associated with the first set of transformed biometric data submitted with the authentication request and a second secret feature transform key with which the received second set of biometric data was transformed at enrolment of the second set of transformed biometric data at the network node, transforming the captured biometric data into a second set of non-invertible biometric data using the received second secret feature transform key, and comparing the second set of transformed captured biometric data with the second set of transformed biometric data received from the trusted network node, and it there is a match authenticating the user at the client device.

This object is attained in an eighth aspect of the invention by a client device configured to enable authentication of a user of the client device based on biometric data enrolled at a trusted network node. The client device comprises a biometric data sensing system comprises a biometric data sensor and a processing unit, the biometric data sensor is configured to capture biometric data of the user, the processing unit is configured to transform the captured biometric data into a first set of non-invertible biometric data using a first secret feature transform key shared with the client device, to submit, to the trusted network node, a request to authenticate the user of the client device, the authentication request comprising the first set of transformed biometric data, and receive, from the trusted network node, at least one second set of transformed biometric data associated with the first set of transformed biometric data submitted with the authentication request and the second secret feature transform key with which the received second set of biometric data was transformed at enrolment of the transformed biometric data at the network node. The processing unit is further configured to transform the captured biometric data into a second set of non-invertible biometric data using the received second secret feature transform key, and compare the second set of transformed captured biometric data with the second set of transformed biometric data received from the trusted network node, and it there is a match authenticate the user at the client device.

In brief, a first client device embodied e.g. in the form of a smart phone captures biometric data of a user, for instance using a fingerprint sensor. This biometric data is then protected at the smart phone using a feature transform, where a first and a second transform is created from the captured biometric data, and securely registered, or enrolled, with a remotely located trusted network node, which stores the two sets of protected biometric data in a secure central repository. Subsequently, the user will authenticate herself at a local computing station, i.e. a second client device, by having the computing station capture the biometric data of the user, protect the captured biometric data by creating a first transform, and match the first transform at the trusted server with the first transform data that previously was registered with the trusted server to perform a pre-match in order to reduce the potential number of matchings to be performed at the computing station.

Upon successful pre-match, the trusted server will submit the second enrolled transform along with a transformation key used to create the second transform at enrolment. The computing station creates a second transform of the captured biometric data using the received transformation key and attempts to match the created second transform to the received second transform.

Upon successful authentication, the user will be given access to the local computing station. Advantageously, a clear-text copy of the biometric data of the user never leaves the smart phone or the local computing station.

As an alternative, the user enrols with the trusted server via the computing station as an alternative to using his/her smart phone. In such a scenario, both enrolment and authentication is performed by the same client device.

In more detail, the smart phone captures biometric data of the user and transforms the captured biometric data into a first and second set of transformed biometric data using a suitable feature transform scheme. The transform scheme used should produce transformed biometric data which is non-invertible, i.e. it should be infeasible for an attacker to reconstruct the original biometric data even with access to both a feature transformation key used in the feature transform and the transformed biometric data.

The feature transformation key used to create the first transformed set is pre-configured in the system and common for all users, while the feature transformation key used to create the second transformed set is individual and shared by the enrolling client device and the trusted server.

The smart phone submits the transformed biometric data sets over a secure channel, i.e. a communication channel being protected in terms of confidentiality and integrity, to the remotely located trusted server along with the second secret feature transformation key (unless the second key is preconfigured to be shared by the smart phone and the trusted server).

The trusted server stores the received transformed biometric data sets and the second feature transformation key (it already has access to the first key), referred to as an enrolment set, in a secure end-user repository, and the enrollment of the user with the trusted server is thereby completed.

It should be noted that the secure end-user repository typically contains a large number of enrollments; thousands of users may be enrolled with the trusted server, and a user potentially registers a plurality of transformed biometric data sets with the trusted server.

Advantageously, by using the feature transform scheme, the biometric data is not stored in the clear outside of the user's trusted client device.

Now, a user wishing to access the local computing station will need to authenticate herself with the trusted server with which she previously enrolled via the smart phone or the computing station.

Hence, the user provides her biometric data at the computing station, which derives the fingerprint data of the user with a suitable biometric sensor and uses the pre-stored first transformation key to create the first set of transformed biometric data, and submits the first set of transformed biometric data to the trusted server in an authentication request over a secure channel.

Upon receiving the authentication request comprising the first set of transformed biometric data, the trusted server fetches one or more enrollment sets associated with this particular first set of transformed biometric data from the repository. These fetched enrollment sets are referred to as candidate enrollment sets, which are returned over the secure channel to the computing station.

Hence, a "pre-match" is advantageously performed at the trusted server utilizing the first set of transformed biometric data to fetch the adequate candidate enrollment sets, having as an effect that a largely reduced number of candidate enrollment sets will be considered by the computing station as compared to a scenario where the pre-match is not performed.

The returned candidate set(s) should comprise at least the second set of transformed biometric data and the second transformation key employed to transform the second set during enrollment.

Thereafter, the computing station uses the second transformation key of the received candidate enrollment set(s) to create a corresponding second set of transformed biometric data.

Then, the computing station attempts to match each created second set of transformed biometric data to the corresponding received second set of transformed biometric data, and if at least one match can be found the user is authenticated and thus given access to the computing station.

In an embodiment, the local computing station digitally signs at least one of the second sets of transformed biometric data, and submits the digitally signed second set of transformed biometric data to the trusted server, which in its turn performs a verification process for the digitally signed second set of transformed biometric data. If the verification is successful, the trusted server submits an authentication grant to the client device. Advantageously, a higher level of security is provided by means of verification of the digital signature.

In a further embodiment, the trusted server associates each set of transformed biometric data stored in the secure end-user repository with an index number, which is also included in the enrolment sets and consequently in the candidate enrolment set(s) submitted to the local station. Subsequently, when receiving a digitally signed second set of transformed biometric data from the local station, the corresponding index number is included. The trusted server verifies that each index number received from the computing station complies with the previously submitted corresponding index number before an authentication grant can be issued. Advantageously, the verification of the index number further raises the security level of the system.

Further embodiments will be described in the following.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, in which.

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

Figure 1:
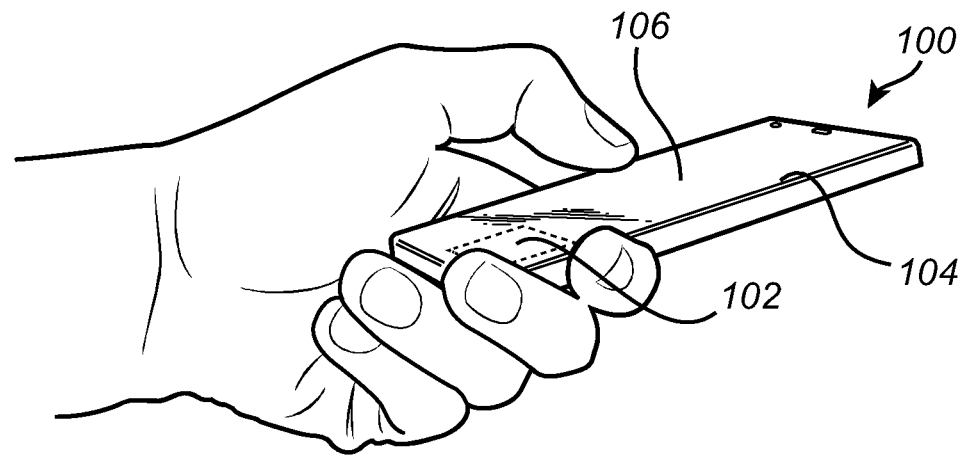
FIG. 1 shows an electronic device in the form of a smart phone in which the present invention may be implemented.

FIG. 1 shows a client device 100 in the form of a smart phone in which the present invention may be implemented. The smart phone 100 is equipped with a fingerprint sensor 102 and a display unit 104 with a touch screen interface 106. The fingerprint sensor 102 may, for example, be used for unlocking the mobile phone 100 and/or for authorizing transactions carried out using the mobile phone 100, etc. The fingerprint sensor 102 may alternatively be placed on the backside of the mobile phone 100. It is noted that the fingerprint sensor 102 could be integrated in the display unit/touch screen or form part of a smart phone home button.

It is understood that the fingerprint sensor 102 according to embodiments of the invention may be implemented in other types of electronic devices, such as laptops, remote controls, tablets, smart cards, etc., or any other type of present or future similarly configured device utilizing fingerprint sensing.

Figure 2:
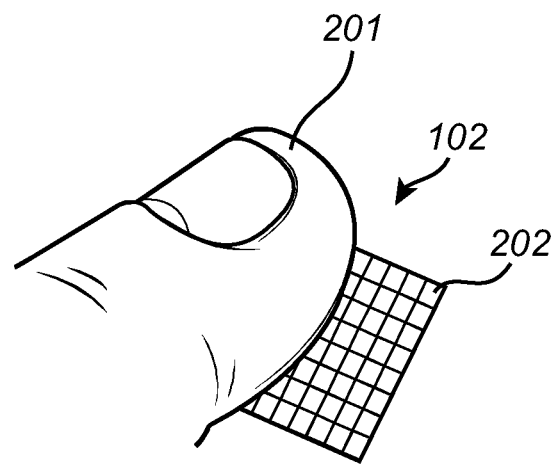
FIG. 2 shows a view of a fingerprint sensor onto which a user places the finger.

FIG. 2 illustrates a somewhat enlarged view of the fingerprint sensor 102 onto which a user places her finger 201. In the case of employing a capacitive sensing technology, the fingerprint sensor 102 is configured to comprise a plurality of sensing elements. A single sensing element (also denoted as a pixel) is in FIG. 2 indicated by reference numeral 202.

Figure 3:
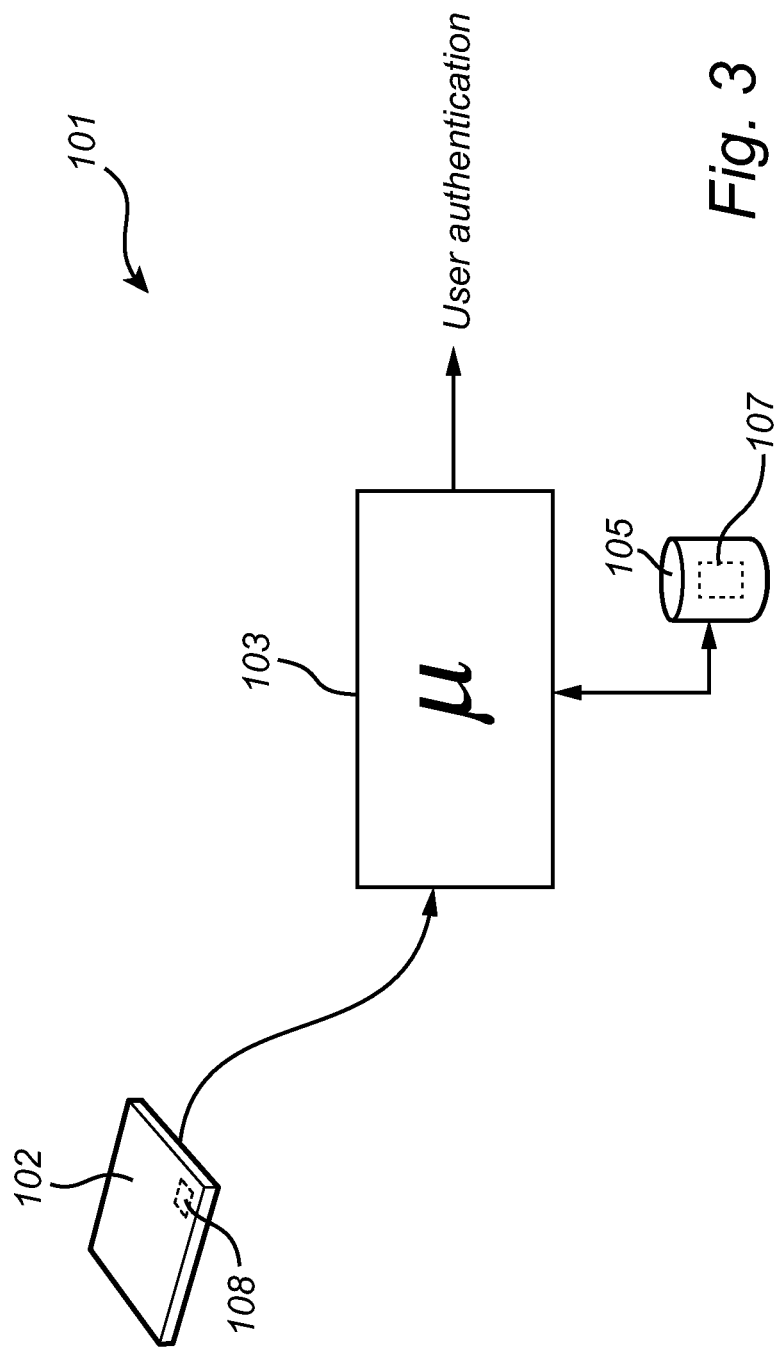
FIG. 3 shows a fingerprint sensor being part of a fingerprint sensing system according to an embodiment.

FIG. 3 shows the fingerprint sensor 102 being part of a fingerprint sensing system 101. The fingerprint sensing system 101 comprises the fingerprint sensor 102 and a processing unit 103, such as a microprocessor, for controlling the fingerprint sensor 102 and for analysing captured fingerprints. The fingerprint sensing system 101 further comprises a memory 105. The fingerprint sensing system 101 in turn, typically, forms part of the electronic device 100 as exemplified in FIG. 1.

Now, upon an object contacting the fingerprint sensor 102, the sensor 102 will capture an image of the object in order to have the processing unit 103 determine whether the object is a fingerprint of an authorised user or not by comparing the captured fingerprint to one or more authorised fingerprint templates pre-stored in the memory 105.

The fingerprint sensor 102 may be implemented using any kind of current or future fingerprint sensing principle, including for example capacitive, optical, ultrasonic or thermal sensing technology. Currently, capacitive sensing is most commonly used, in particular in applications where size and power consumption are important. Capacitive fingerprint sensors provide an indicative measure of the capacitance between (see FIG. 2) several sensing elements 202 and a finger 201 placed on the surface of the fingerprint sensor 102. Acquisition of a fingerprint image is typically performed using a fingerprint sensor 102 comprising a plurality of sensing elements 202 arranged in a two-dimensional manner.

In a general authorization process, the user places her finger 201 on the sensor 102 for the sensor to capture an image of the fingerprint of the user. The processing unit 103 evaluates the captured fingerprint and compares it to one or more authenticated fingerprint templates stored in the memory 105. If the recorded fingerprint matches the pre-stored template, the user is authenticated and the processing unit 103 will typically instruct the smart phone 100 to perform an appropriate action, such as transitioning from locked mode to unlocked mode, in which the user is allowed access to the smart phone 100.

With reference again to FIG. 3, the steps of the method performed by the fingerprint sensing system 101 (apart from capturing the image, which is carried out by the sensor 102) are in practice performed by the processing unit 103 embodied in the form of one or more microprocessors arranged to execute a computer program 107 downloaded to the storage medium 105 associated with the microprocessor, such as a Random Access Memory (RAM), a Flash memory or a hard disk drive. The processing unit 103 is arranged to cause the fingerprint sensing system 101 to carry out the method according to embodiments when the appropriate computer program 107 comprising computer-executable instructions is downloaded to the storage medium 105 and executed by the processing unit 103. The storage medium 105 may also be a computer program product comprising the computer program 107. Alternatively, the computer program 107 may be transferred to the storage medium 105 by means of a suitable computer program product, such as a Digital Versatile Disc (DVD) or a memory stick. As a further alternative, the computer program 107 may be downloaded to the storage medium 105 over a network. The processing unit 103 may alternatively be embodied in the form of a digital signal processor (DSP), an application specific integrated circuit (ASIC), a field-programmable gate array (FPGA), a complex programmable logic device (CPLD), etc. It should further be understood that all or some parts of the functionality provided by means of the processing unit 103 may be at least partly integrated with the fingerprint sensor 102.

Figure 4:
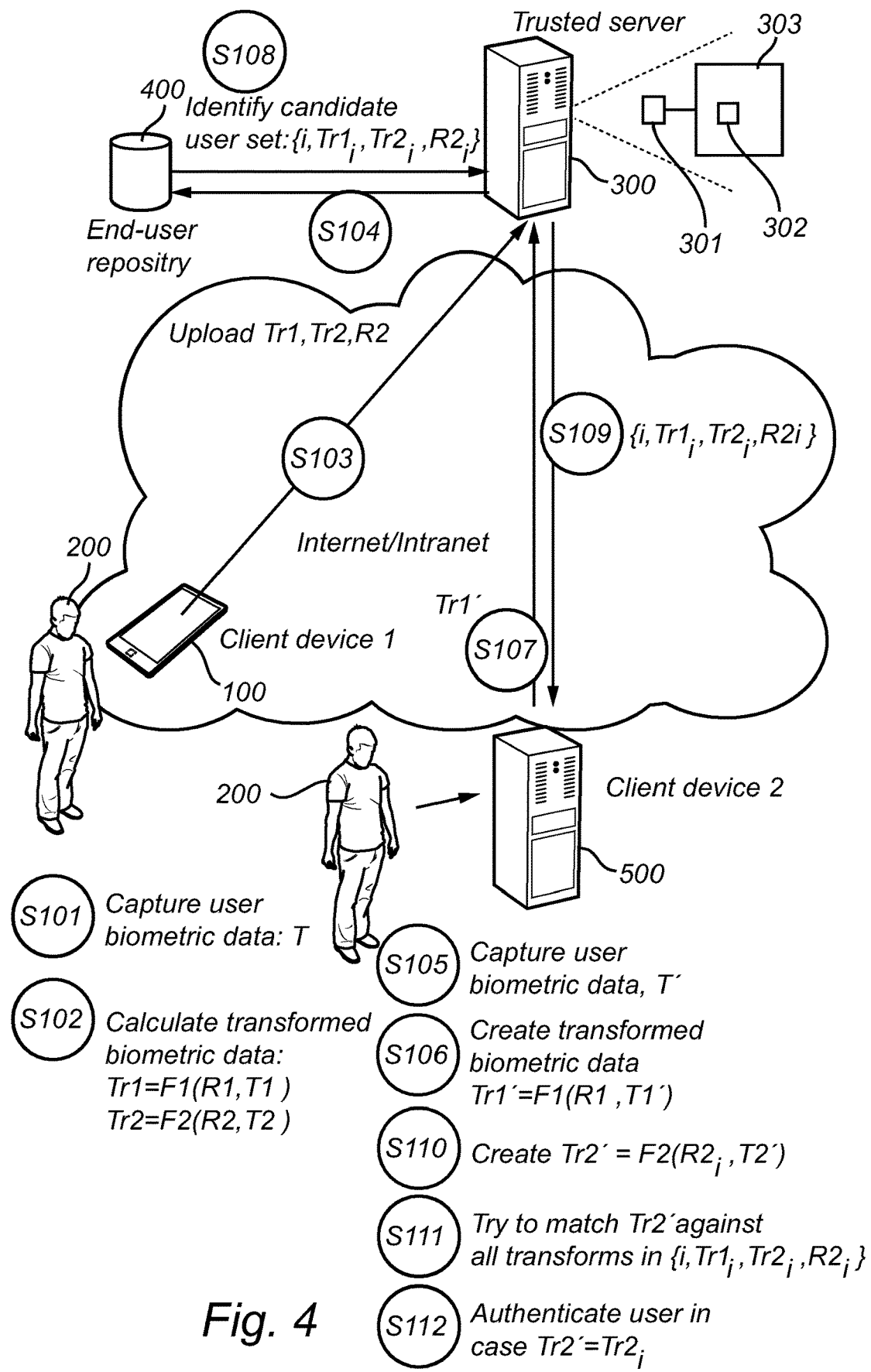
FIG. 4 illustrates a signalling diagram of enrolling transformed biometric data of a user at a trusted server and subsequently authenticating a user based on the enrolled transformed biometric data according to an embodiment.

FIG. 4 illustrates an embodiment of enabling authentication of user 200 of a second client device 500 over a secure communication channel based on biometric data captured by a first client device 100 and enrolled at a trusted network node 300.

In brief, a client device 100 embodied e.g. in the form of a smart phone captures biometric data of a user 200, e.g. in the manner described with reference to FIGS. 1-3. This biometric data is then protected at the smart phone and securely registered, or enrolled, with a remotely located trusted network node, embodied in the form of a server 300, which stores the protected biometric data in a secure central repository 400. Subsequently, the user 200 will authenticate herself at a local computing station 500, i.e. a second client device, by having the computing station 500 capture the biometric data of the user, protect the captured biometric data, and match the protected biometric data at the computing station 500 with the protected biometric data that previously was registered with the trusted server 300, and now transmitted to the local computing station 500. Upon successful authentication, the user 200 will be given access to the local computing station 500. It is noted that a clear-text copy of the biometric data of the user 200 never leaves the smart phone 100 or the local computing station 500.

As previously mentioned, in many situations a need arises to securely identify an end-user at a local computing station 500. This can for instance be a medical system station in a hospital or similar. In this scenario, the local station 500 as such is considered trusted, but a "proof" may be required that only a legitimate user is allowed to access the station 500. This can be solved using traditional login procedures using username and passwords, hardware tokens, or biometrics such as fingerprints.

However, traditional biometric identification solutions typically require that complete biometric profiles of all authorized users are stored in a central repository 400 of a trusted server 300 where efficient template-matching is performed to authenticate users. Biometric profiles are very privacy sensitive and one would like to avoid storing biometric profiles in clear text in any central location.

Hence, authorized medical personnel such as doctors and nurses are authenticated to local computing stations using biometrics managed by the trusted server 300 and stored in the central repository 400. The medical personnel can for instance register, or enrol, to the trusted server 300 using their smart phone 100 with biometric data sensing capabilities and then login to any of the many local computing stations distributed over the hospital premises using local biometrics readers directly attached to the distributed computing stations 500. It is also possible that the users register with the trusted server 300 via any one of the local computing stations 500 as an alternative to using their smart phone 100.

With reference to FIG. 4, the smart phone 100 captures biometric data T of the user 200 in step S101, using e.g. a fingerprint sensor as described with reference to FIGS. 1-3.

In step S102, the smart phone 100 transforms at least a first subset T1 of the captured biometric data T into a first transformed biometric data set Tr1, using a suitable feature transform scheme.

The transform scheme used should produce transformed biometric data denoted Tr1=F1(R1, T1) which is non-invertible, i.e. it should be infeasible for an attacker to reconstruct the original biometric data T (or T1) even with access to both the feature transformation key R1 and the transformed biometric data Tr. This first feature transformation key R1 is pre-configured in the system and common for all users.

Further in step S102, the smart phone 100 transforms at least a second subset T2 of the captured biometric data T into a using transformed biometric data set Tr2, using a second feature transformation key R2 used for this particular user: Tr2=F2(R2, T2).

For instance, one half of the biometric data set T may constitute the first subset T1 while the other half constitutes the second subset T2.

The second secret feature transformation key R2 may be generated at the smart phone 100 by means of an appropriate pseudorandom function (PRF). Alternatively, the smart phone 100 receives the second secret feature transformation key R2 from the trusted server 300. In this exemplifying embodiment, it is assumed that the second secret feature transformation key R2 is generated at the smart phone 100 and subsequently submitted to the trusted server 300, Alternatively, the full biometric data set T could be included in each transform, resulting in Tr1=F1(R1,T), Tr2=F2(R2,T). However, it is advantageous for security reasons to use only a subset of the biometric data in each transform.

A number of different transform functions F may be envisaged, such as Cartesian, polar or functional transformations, or a non-invertible transformation function built upon an approximation Message Authentication Code (MAC) scheme.

The smart phone 100 submits in step S103 the transformed biometric data sets Tr1 and Tr2 over a secure channel, i.e. a communication channel being protected in terms of confidentiality and integrity, e.g. via the Internet, to the remotely located trusted server 300 along with the second secret feature transformation key R2 unless R is preconfigured to be shared by the smart phone 100 and the trusted server 300, as previously discussed.

The trusted server 300 stores the received transformed biometric data sets Tr1 and Tr2 and the second feature transformation key R2, referred to as an enrolment set, in a secure end-user repository 400 in step S104, located either locally at or remote from the remote server 300, and the enrollment of the user 200 with the trusted server 300 is thereby completed.

It should be noted that the secure end-user repository 400 typically contains a large number of enrollments; thousands of users may be enrolled with the trusted server 300, and a user potentially registers a plurality of transformed biometric data sets with the trusted server 300, even using different feature transformation keys for each transformed biometric data set.

Hence, for each registered first and second transformed biometric data set Tr1 and Tr2 and second feature transformation key R2, an index i is optionally created by the trusted server 300, thereby resulting in an enrollment set {i, $Tr1_i$, $Tr2_i$, $R2_i$}, which set is stored in the secure end-user repository 400 in step S104. As a result, if the user 100 has registered for instance five biometric profiles, each has a unique index number i associated with the particular user identifier.

Advantageously, by using the feature transform scheme, the biometric data T is not stored in the clear outside of the user's trusted client device, i.e. the smart phone 100.

Now, a user wishing to access the local computing station 500 will need to authenticate herself with the trusted server 300 with which she previously has enrolled.

Hence, the user (which in this particular example is assumed to be the user 200 that enrolled with the trusted server in steps S101-S104) presents her biometric data T', e.g. her fingerprint, to the computing station 500 being equipped with a suitable biometric sensor in step S105, which transforms a subset T1' of the biometric template T' using the system-common first secret feature transformation key R1 in step S106 thereby creating a first set of transformed biometric data Tr1'=F1(R1, T1') and submits the first transformed biometric data set Tr1' to the trusted server 300 in an authentication request in step S107 over a secure channel.

Upon receiving the authentication request comprising the first transformed biometric data set Tr1', the trusted server 300 fetches one or more enrollment sets {i, $Tr1_i$, $Tr2_i$, $R2_i$} associated with this particular user as identified by Tr1' from the repository 400 in step S108. These fetched enrollment sets are referred to as candidate enrollment sets, which are returned over the secure channel to the computing station 500 in step S109. Hence, a "pre-match" is advantageously performed at the trusted server 300 utilizing the first transformed biometric data set Tr1' to fetch the adequate candidate enrollment sets, having as an effect that a largely reduced number of candidate enrollment sets will be considered by the computing station 500 as compared to a scenario where the pre-match is not performed.

Thereafter, the computing station 500 (being equipped with a suitable biometric sensor) transforms a second subset T2' of the fingerprint data T' of the user 200 in step S110 using the second transformation key $R2_i$ of each candidate enrollment set received in step S109 to create a corresponding set of second transformed biometric data Tr2'=F(R2$_i$, T2'). It is noted that the second feature transformation key $R2_i$ may be the same or different for each enrollment set.

Then, the computing station 500 attempts to match each created second set of transformed biometric data Tr2' to the corresponding received second transformed biometric data set $Tr2_i$ in step S111, and if at least one match can be found the user 200 is authenticated in step S112 and thus given access to the computing station 500, or to some protected data stored at the station.

Alternatively, in an embodiment providing for stricter security, in case the user 200 has enrolled a plurality of enrollment sets with the trusted server 300, a match must be attained for more than one enrollment set. In case even stricter security is required, it can even be envisaged that all sets of transformed biometric data must match.

Advantageously, as can be concluded from the above, no clear text biometric data is stored at the trusted server 300, which considerably increases a user's trust in using the system.

With reference to FIG. 4, the steps of the method performed by the remote server 300 are in practice performed by a processing unit 301 embodied in the form of one or more microprocessors arranged to execute a computer program 302 downloaded to a storage medium 303 associated with the microprocessor, such as a Random Access Memory (RAM), a Flash memory or a hard disk drive. The processing unit 301 is arranged to cause the remote server 300 to carry out the method according to embodiments when the appropriate computer program 302 comprising computer-executable instructions is downloaded to the storage medium 303 and executed by the processing unit 301. The storage medium 303 may also be a computer program product comprising the computer program 302. Alternatively, the computer program 302 may be transferred to the storage medium 303 by means of a suitable computer program product, such as a Digital Versatile Disc (DVD) or a memory stick. As a further alternative, the computer program 302 may be downloaded to the storage medium 303 over a network. The processing unit 301 may alternatively be embodied in the form of a digital signal processor (DSP), an application specific integrated circuit (ASIC), a field-programmable gate array (FPGA), a complex programmable logic device (CPLD), etc.

Figure 5:
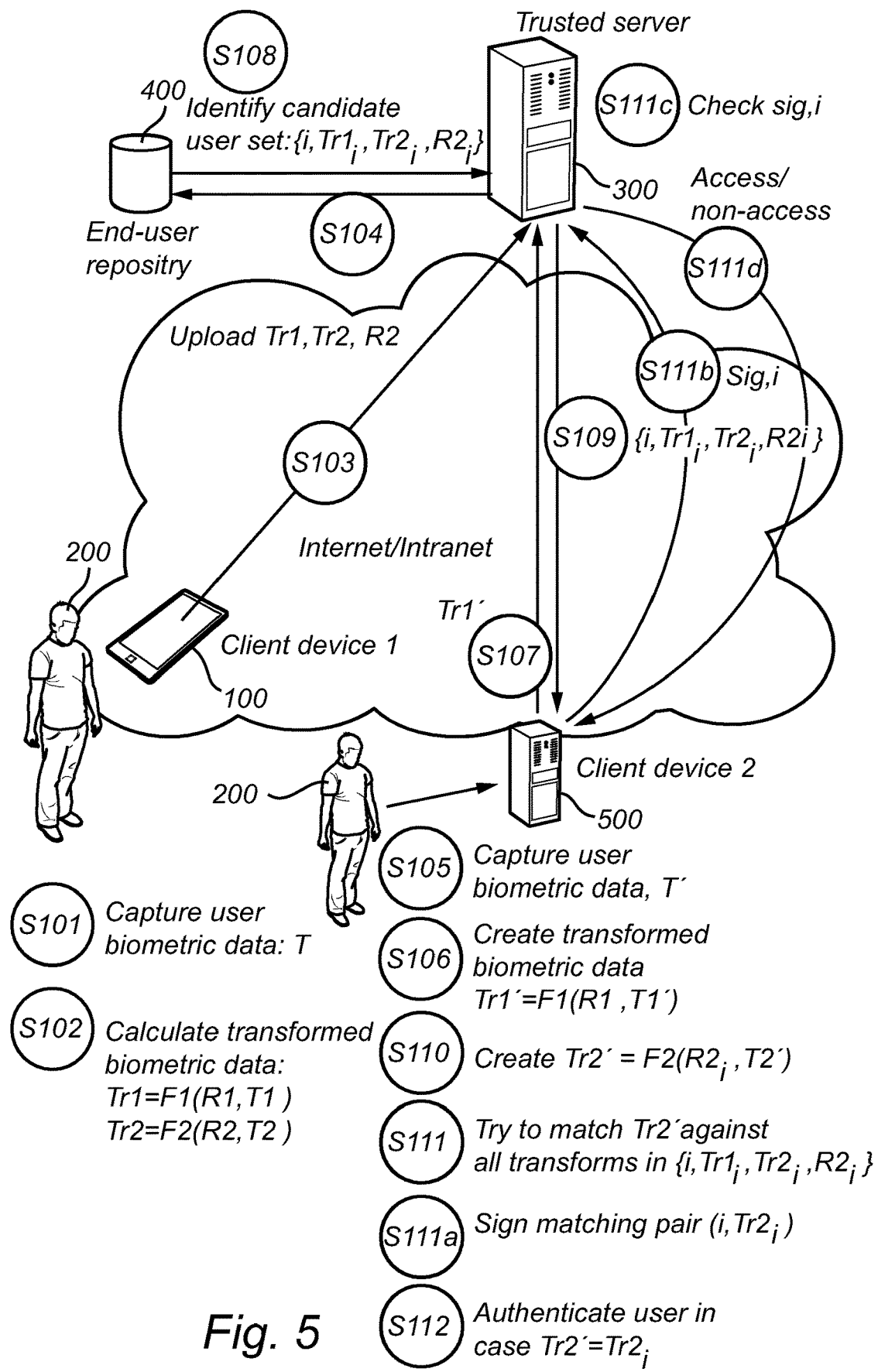
FIG. 5 illustrates a signalling diagram of enrolling transformed biometric data of a user at a trusted server and subsequently authenticating a user based on the enrolled transformed biometric data according to another embodiment.

FIG. 5 illustrates a further embodiment of enabling authentication of user 200 of a second client device 500 over a secure communication channel based on biometric data captured by a first client device 100 and enrolled at a trusted network node 300.

Now, in this embodiment, after the computing station 500 matches the second set of transformed biometric data Tr2' to the corresponding received second set of transformed biometric data $Tr2_i$ in step S111, the computing station proceeds to step S111a where it digitally signs the second set of transformed biometric data $Tr2_i$ and corresponding index i for which there is a match, which is denoted sig=SIG(Pr, i||Tr2$_i$) where || denotes concatenation.

Pr is a private key of an asymmetric key pair shared with the trusted server 300, where a corresponding public key is denoted Pu. The computing station 500 is typically preconfigured with the asymmetric key pair.

It is further envisaged that the signature may be extended with a matching score M indicating how well two transformed biometric data sets match, resulting in sig=SIG(Pr, M||i||Tr2$_i$).

Thereafter, in step S111b, sig and optionally i (and the matching score M, in case the signature comprises M) is submitted to the trusted server 300 over the secure channel, which in this turn verifies sig using the public key Pu, and optionally also verifies the index i in step 111c, and in case the digital signature sig (and optionally i) is successfully verified, the trusted server 300 returns an authentication grant in step S111d. The matching score M may be used to determine at the trusted server 300 if the matching is good enough. If not, the user may not be authenticated, or may be required to enter a personal code such as a pin code, or a password, at the local station.

Hence, the trusted server 300 may verify that the unique index i indeed exists for the database held in the repository 400, and that this particular index was part of the candidate enrollment set(s) submitted in step S108. Upon receiving the authentication grant, the local computing station authenticates the user 200 in step S112. Advantageously, a higher level of security is provided by means of verification of the digital signature sig.

Further, in the embodiment where an index number i is associated with each enrollment set for a particular user as identified with the first set of transformed biometric data Tr1, an even higher level of security is provided since not only the digital signature sig is verified but also the index number i (and potentially even the matching score M). The invention has mainly been described above with reference to a few embodiments. However, as is readily appreciated by a person skilled in the art, other embodiments than the ones disclosed above are equally possible within the scope of the invention, as defined by the appended patent claims.

What is claimed is:

1. A method performed by a client device of enabling authentication of a user of the client device based on biometric data captured by the client device, comprising:
   capturing at least one set of biometric data of the user; transforming the at least one set of biometric data into a first and a second set of non-invertible biometric data; and
   submitting an enrolment request comprising the first and second transformed sets of biometric data over a secure communication channel to a trusted network node, the first set of biometric data being transformed using a first secret feature transformation key shared with the trusted network node and any device at which the user is to be authenticated, the second set of biometric data being transformed using a second secret feature transformation key shared with the trusted network node.

2. The method of claim 1, wherein the transforming of the biometric data into non-invertible biometric data is performed using a feature transform.

3. The method of claim 1, further comprising:
   generating the second secret feature transformation key at the client device, wherein the submitting of the enrolment request to the trusted network node further comprises:
   submitting the generated second secret feature transformation key.

4. The method of claim 1, wherein a plurality of second sets of biometric data are captured at the client device, transformed into non-invertible biometric data, and submitted with the enrolment request.

5. A method performed by a network node of enabling authentication of a user of a client device based on biometric data captured by the client device, comprising:
   receiving, from the client device, an enrolment request comprising at least a first and a second set of transformed biometric data of the user over a secure communication channel; and
   storing the received first and second set of transformed biometric data in a secure end-user repository, the first set of biometric data being transformed using a first secret feature transformation key shared with the trusted network node and any device at which the user is to be authenticated, the second set of biometric data being transformed using a second secret feature transformation key shared with the trusted network node.

6. The method of claim 5, wherein a plurality of second sets of transformed biometric data are received with the enrolment request and stored in the secure end-user repository with the respective secret feature transform key.

7. A method performed by a network node of enabling authentication of a user of a client device based on biometric data captured by the client device, comprising:
   receiving, from the client device, a request to authenticate a user of the client device, the authentication request comprising a first set of transformed biometric data transformed with a first secret feature transform key shared with the client device;
   fetching, from the secure end-user repository, a second set of enrolled transformed biometric data associated with the first set of transformed biometric data received from the client device and a second secret feature transform key with which the second set of biometric data was transformed at enrolment of the transformed biometric data at the network node; and
   submitting the second set of transformed biometric data and the second secret feature transform key over a secure communication channel to the client device.

8. The method of claim 7, the fetching further comprising fetching a first set of enrolled transformed biometric data associated with the second set of transformed biometric data during enrolment, wherein the first set of enrolled transformed biometric data further is submitted to the client device.

9. The method of claim 7, wherein a plurality of second sets of enrolled transformed biometric data associated with the first set of transformed biometric data received from the client device are fetched from the secure end-user repository and submitted to the client device.

10. The method of claim 7, further comprising:
    receiving, from the client device, at least one digitally signed set of the second transformed biometric data;
    verifying said at least one digitally signed second set of transformed biometric data; and if the verification is successful:
    submitting an authentication grant to the client device.

11. The method of claim 7, further comprising:
    associating each second set of transformed biometric data stored in the secure end-user repository with an index number, wherein the submitting of the plurality of second sets of transformed biometric data associated with the first set of transformed biometric data received from the client device further comprises:
submitting the index number associated with each second set of transformed biometric data, wherein the receiving, from the client device, of at least one digitally signed second set of transformed biometric data further comprises:
receiving an index number for each digitally signed second set of transformed biometric data; and the verifying of said at least one digitally signed second set of transformed biometric data further comprises:
verifying that each index number received from the client device complies with the previously submitted corresponding index number for each second set of transformed biometric data.

12. A method performed by a client device of enabling authentication of a user of the client device based on biometric data enrolled at a trusted network node, comprising:
capturing biometric data of the user;
transforming the captured biometric data into a first set of non-invertible biometric data using a first secret feature transform key shared with the trusted network node;
submitting, to the trusted network node, a request to authenticate the user of the client device, the authentication request comprising the first set of transformed biometric data;
receiving, from the trusted network node, at least one second set of transformed biometric data associated with the first set of transformed biometric data submitted with the authentication request and a second secret feature transform key with which the received second set of biometric data was transformed at enrolment of the second set of transformed biometric data at the network node;
transforming the captured biometric data into a second set of non-invertible biometric data using the received second secret feature transform key; and
comparing the second set of transformed captured biometric data with the second set of transformed biometric data received from the trusted network node; and if there is a match:
authenticating the user at the client device.

13. The method of claim 12, the receiving further comprising receiving a first set of enrolled transformed biometric data associated with the second set of transformed biometric data during enrolment.

14. The method of claim 12, wherein a plurality of second sets of transformed biometric data are received from the trusted network node and compared to the second set of biometric data transformed at the client device, wherein the user is authenticated if the second set of biometric data transformed at the client device matches each one of the second sets of transformed biometric data received from the trusted network node.

15. The method of claim 12, further comprising:
digitally signing the at least one received second set of transformed biometric data for which there is a match;
submitting the digitally signed second set of biometric data to the trusted network node;
receiving, from the trusted network node in case the trusted network node successfully verifies the digitally signed second set of biometric data, an authentication grant, wherein the user is authenticated at the client device.

16. The method of claim 15, wherein the receiving of the plurality of second sets of transformed biometric data further comprises:
receiving an index number associated with each second set of transformed biometric data, and wherein the submitting of at least one digitally signed second set of transformed biometric data further comprises:
submitting the index number for each digitally signed second set of transformed biometric data.

17. The method of claim 12, wherein the client device requesting authentication is different from the client device requesting enrolment.

* * * * *